US010350691B2

(12) United States Patent
Williamson et al.

(10) Patent No.: US 10,350,691 B2
(45) Date of Patent: Jul. 16, 2019

(54) WATER COOLED WIRE FEED TIP COLLAR FOR LASER BRAZING SYSTEM

(71) Applicants: David R Williamson, St. Clair, MI (US); Patrick Rota, Detroit, MI (US)

(72) Inventors: David R Williamson, St. Clair, MI (US); Patrick Rota, Detroit, MI (US)

(73) Assignee: FCA US LLC, Auburn Hills, MI (US)

( * ) Notice: Subject to any disclaimer, the term of this patent is extended or adjusted under 35 U.S.C. 154(b) by 365 days.

(21) Appl. No.: 15/406,136

(22) Filed: Jan. 13, 2017

(65) Prior Publication Data

US 2018/0200818 A1   Jul. 19, 2018

(51) Int. Cl.
| | |
|---|---|
| *B23K 1/005* | (2006.01) |
| *B23K 3/047* | (2006.01) |
| *B23K 26/70* | (2014.01) |
| *B23K 3/06* | (2006.01) |
| *B23K 37/00* | (2006.01) |
| *B23K 26/08* | (2014.01) |
| *B23K 26/14* | (2014.01) |

(52) U.S. Cl.
CPC ............ *B23K 1/0056* (2013.01); *B23K 3/047* (2013.01); *B23K 3/063* (2013.01); *B23K 26/0884* (2013.01); *B23K 26/147* (2013.01); *B23K 26/703* (2015.10); *B23K 37/003* (2013.01)

(58) Field of Classification Search
CPC ............. B23K 1/00; B23K 26/70; B23K 3/04
USPC ............... 219/121.6, 121.84, 121.63–121.72
See application file for complete search history.

(56) References Cited

U.S. PATENT DOCUMENTS

| 2,554,236 A | 5/1951 | Bernard |
| 3,803,381 A | 4/1974 | Bernard et al. |
| 4,373,657 A | 2/1983 | Fillon |
| 4,393,298 A | 7/1983 | Frantzreb, Sr. |
| 4,508,951 A | 4/1985 | Rehrig, Jr. |
| 5,473,131 A | 12/1995 | Sperling |

(Continued)

FOREIGN PATENT DOCUMENTS

| DE | 3928092 A1 | 2/1991 |
| KR | 20080055173 A | 6/2008 |

OTHER PUBLICATIONS

International Search Report and Written Opinion dated Jun. 21, 2018 for International Application No. PCT/US2018/013315, International Filing Date Jan. 11, 2018.

(Continued)

*Primary Examiner* — Samuel M Heinrich
(74) *Attorney, Agent, or Firm* — Ralph E. Smith

(57) ABSTRACT

A laser brazing system including a torch body, a wire feed tip, a laser processing head, and a cooling collar. The torch body includes nozzle, mounting, and cooling sections. The nozzle section has a nozzle wall and a feed wire conduit. The cooling section has a cooling barrel, a coolant supply connection, and a coolant return connection. The wire feed tip has a feed wire outlet and is connected to one end of the torch body. The laser processing head directs laser light toward the feed wire outlet. The cooling collar is disposed on the nozzle section and includes a collar body and a coolant conduit. The collar body has a through-bore that receives the nozzle wall. The coolant conduit has an end portion attached to the collar body and a leg portion that transports coolant to and from the end portion.

15 Claims, 6 Drawing Sheets

(56) References Cited

U.S. PATENT DOCUMENTS

| | | | | |
|---|---|---|---|---|
| 5,837,960 | A * | 11/1998 | Lewis | B23K 26/34 |
| | | | | 219/121.63 |
| 6,078,023 | A | 6/2000 | Jones et al. | |
| 6,930,281 | B2 | 8/2005 | Delgado | |
| 8,686,317 | B2 | 4/2014 | Centner | |
| 9,757,816 | B2 * | 9/2017 | Fujita | B23K 26/14 |
| 2011/0248001 | A1 * | 10/2011 | Kawanaka | C30B 11/00 |
| | | | | 219/76.1 |

OTHER PUBLICATIONS

Robo Product Catalogue 3.0, Technology for the Welder's World, Abicor Binzel, Alexander Binzel Schweisstechnik GmbH & Co. KG, Gießen, Germany, www.binzel-abicor.com, retrieved on Jun. 29, 2016; 116 pages.

"Thermal Conductivity of some common Materials and Gases;" The Engineering Toolbox, www.EngineeringToolBox.com, http://www.engineeringtoolbox.com/thermal-conductivity-d_429.html, retrieved on Jun. 29, 2016; 6 pages.

\* cited by examiner

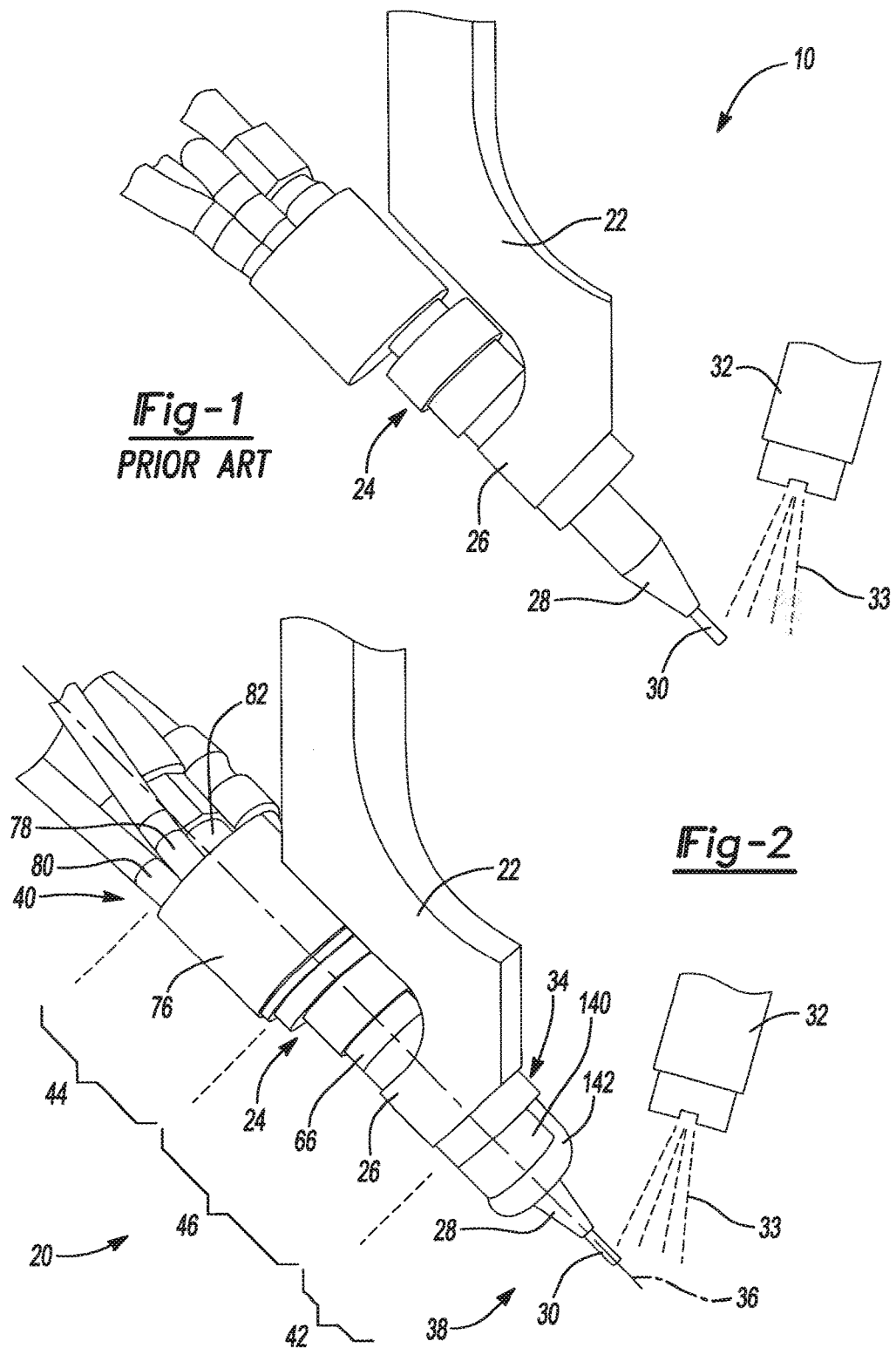

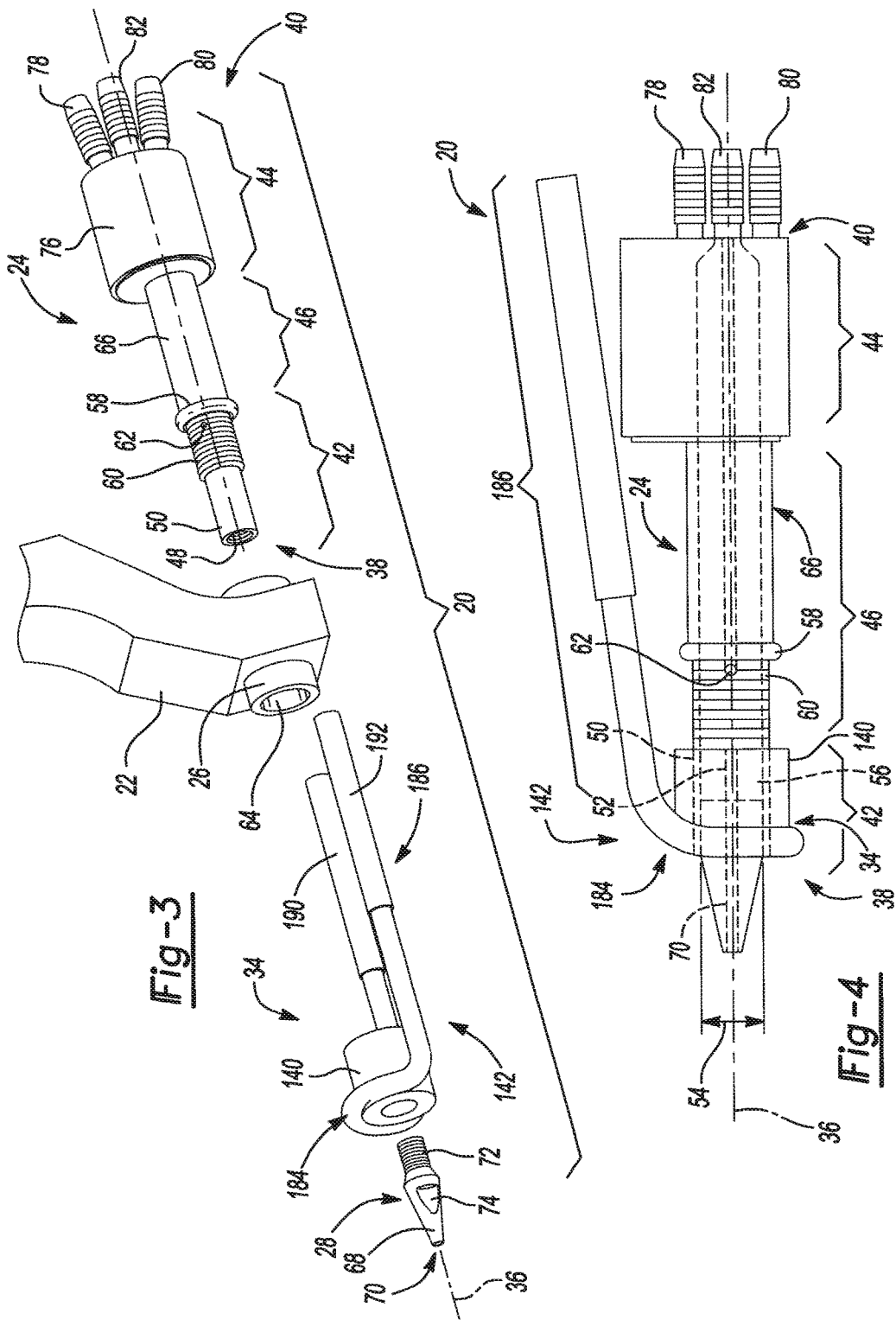

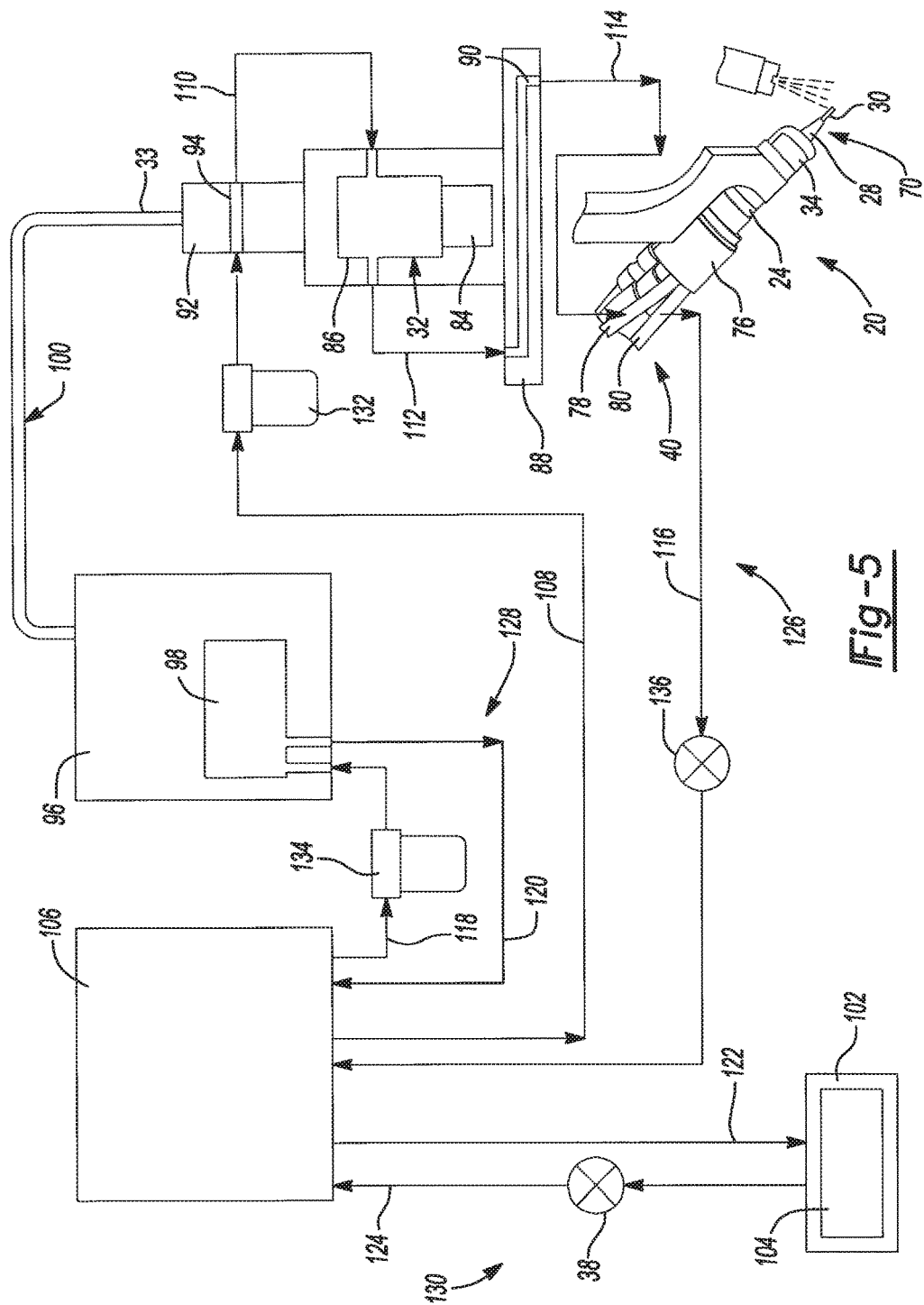

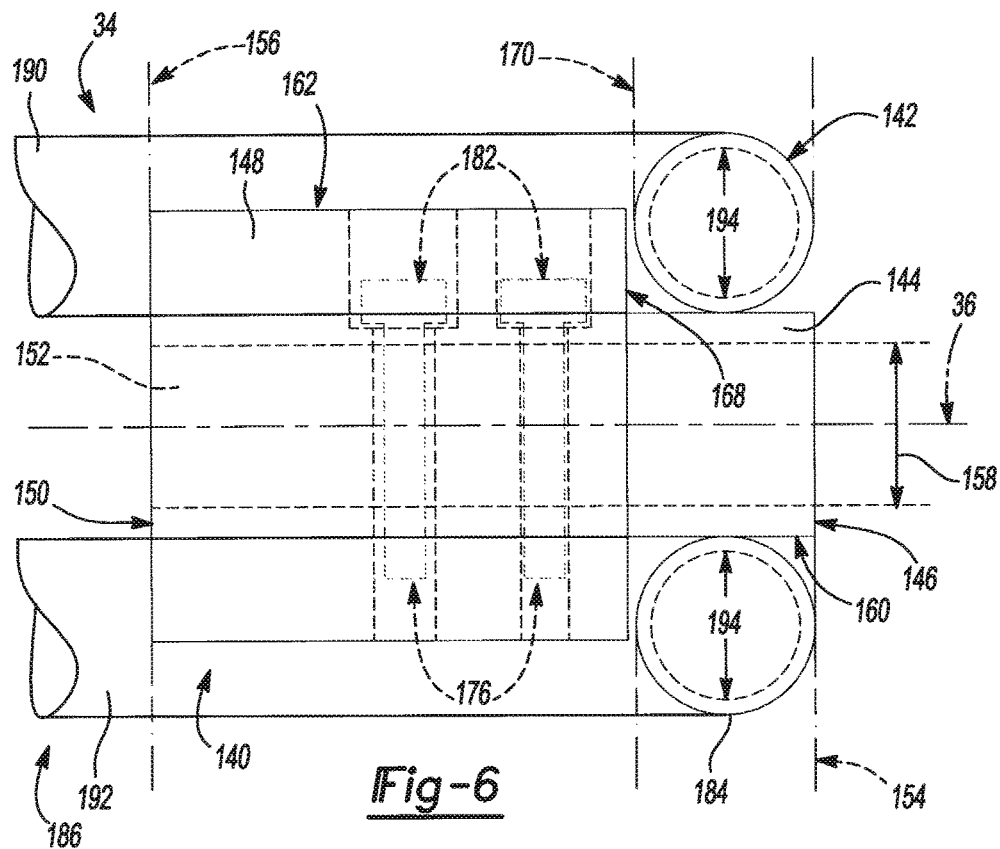
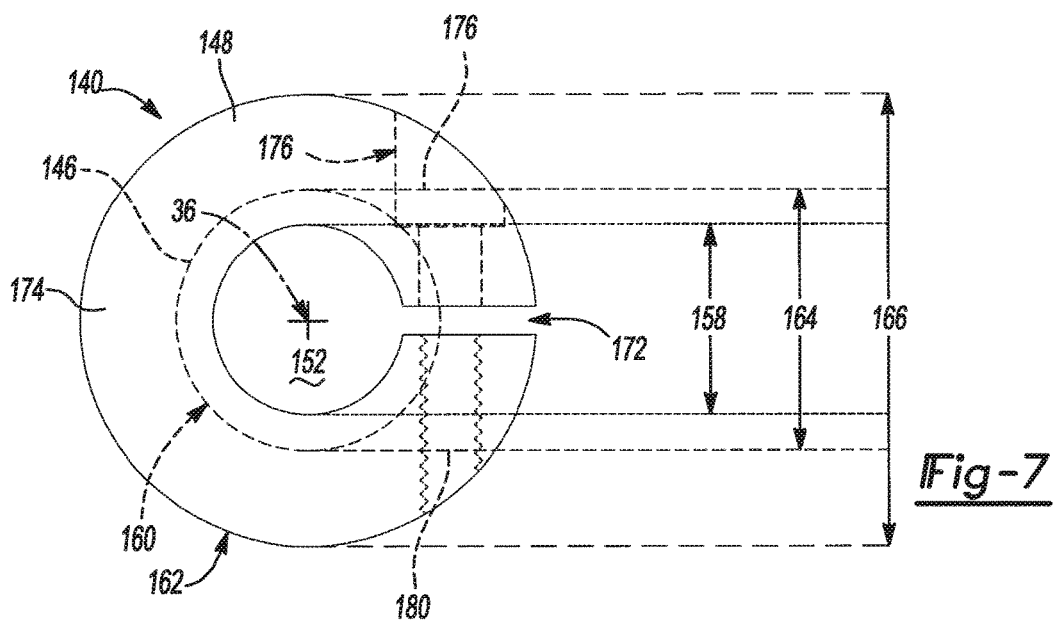

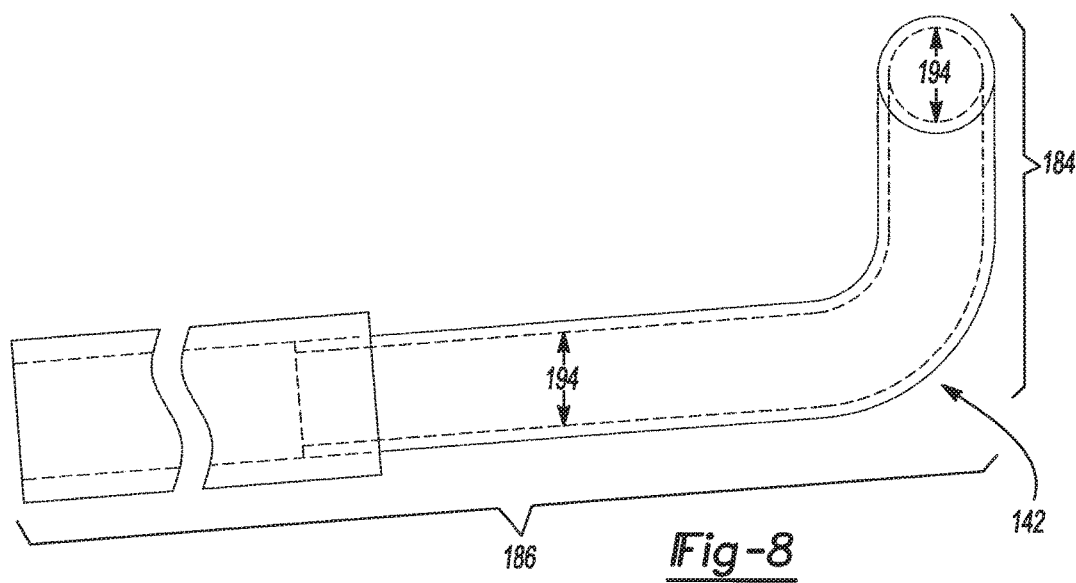
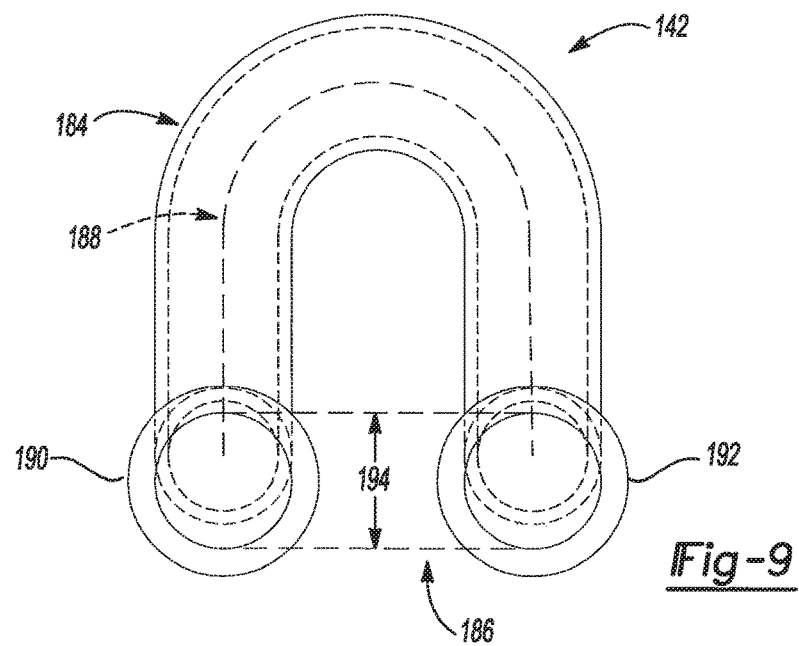

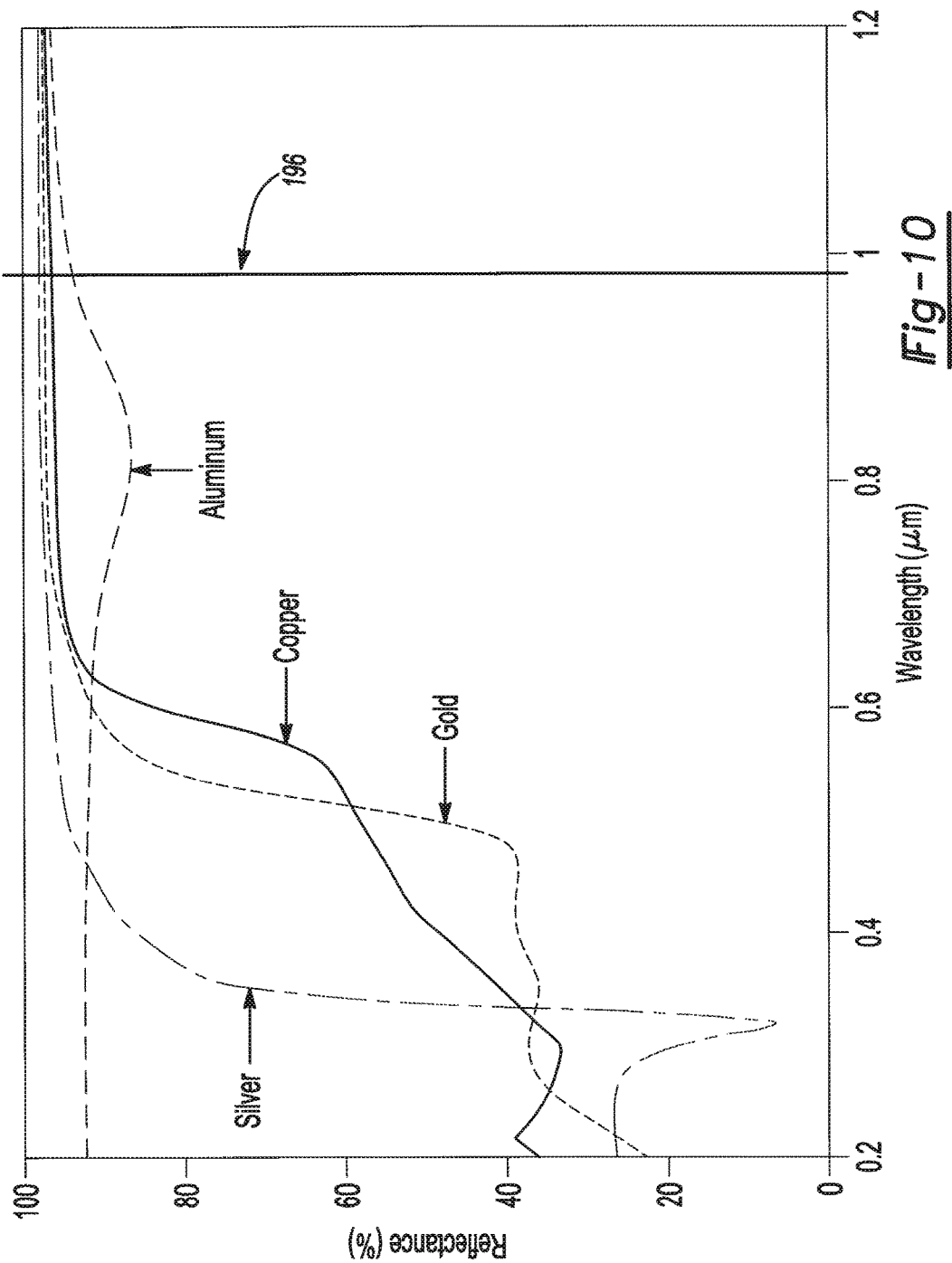

US 10,350,691 B2

WATER COOLED WIRE FEED TIP COLLAR FOR LASER BRAZING SYSTEM

FIELD

The present disclosure generally relates to the field of laser brazing systems. More specifically, a cooling collar is disclosed for cooling the wire feed tip of a laser brazing system.

BACKGROUND

This section provides background information related to the present disclosure which is not necessarily prior art.

Brazing is a common manufacturing process for joining two or more components along a seam or joint. In most cases, the two or more components are made of metal. Together, the two or more components form a workpiece. Brazing is often used in the automotive industry for joining together vehicle body panels, which are typically made of sheet metal. Such brazing operations are often completed autonomously or semi-autonomously by robotic welders as a vehicle moves along an assembly line. The robotic welders used along such assembly lines are typically configurable and can be set up to perform a wide-variety of welding, cutting, or brazing operations. Laser brazing is one such operation. In accordance with this process, a high energy beam of laser light is focused on and melts a bronze filler material. The bronze filler material is provided in the form of a feed wire that is fed out through a wire feed tip attached to a torch body. The torch body is mounted on and articulated by the robotic welder. When the feed wire melts, the bronze filler material enters the seam or joint between the sheet metal panels to form a connection.

Laser brazing presents unique challenges surrounding the management of heat and laser light that is reflected by the feed wire and the workpiece. One problem that exists in this application is that the reflected heat and laser light can heat up the wire feed tip, the closest component of the laser brazing system to the melting bronze filler material of the feed wire and the workpiece. Current robotic welders do not have sufficient cooling to prevent the wire feed tip from becoming overheated in this application, and as a result, the wire feed tip becomes discolored, undergoes premature wear, and can cause wire feed issues resulting in braze defects and equipment downtime.

SUMMARY

This section provides a general summary of the disclosure and is not a comprehensive disclosure of its full scope or all of its features.

In accordance with one aspect of the subject disclosure, a laser brazing system is provided. The laser brazing system includes a torch body that extends from a proximal end to a distal end. The torch body includes a nozzle section at the proximal end, a cooling section at the distal end, and a mounting section disposed between the nozzle section and the cooling section. The nozzle section of the torch body has a nozzle wall, a feed wire conduit arranged within the nozzle section, and a wire feed tip connection at the proximal end of the torch body. The cooling section of the torch body has a cooling barrel, a coolant supply connection, and a coolant return connection. The coolant supply connection and the coolant return connection are disposed in fluid communication with the cooling barrel. During laser brazing operations, the coolant supply connection supplies coolant to the cooling barrel and the coolant return connection receives coolant (i.e. draws coolant away) from the cooling barrel. A wire feed tip, which includes a feed wire outlet, is connected to the proximal end of the torch body at the wire feed tip connection. A laser processing head is positioned to direct laser light toward the feed wire outlet of the wire feed tip. A cooling collar is disposed on the nozzle section of the torch body for cooling the wire feed tip during laser brazing operations. The cooling collar includes a collar body and a coolant conduit that is connected to the collar body. The collar body has a through-bore that is sized to contact and receive the nozzle wall of the nozzle section of the torch body. The coolant conduit has an end portion that is attached to the collar body and a leg portion that is disposed in fluid communication with the end portion. During laser brazing operations, the leg portion of the coolant conduit communicates coolant to and from the end portion of the coolant conduit.

The cooling collar described herein cools the wire feed tip to prevent overheating and premature failure. The advantages of the additional cooling provided by the cooling collar are: increased wire feed tip life, consistent braze quality, and reduced equipment downtime. As a result, laser brazing operations can be completed on a greater number of vehicles before the wire feed tip needs to be replaced.

BRIEF DESCRIPTION OF THE DRAWINGS

Other advantages of the present invention will be readily appreciated, as the same becomes better understood by reference to the following detailed description when considered in connection with the accompanying drawings wherein:

FIG. 1 is a side perspective view of an exemplary laser brazing system that is known in the art;

FIG. 2 is a side perspective view of the exemplary laser brazing system shown in FIG. 1 that has been fitted with an exemplary cooling collar that is constructed in accordance with the subject disclosure;

FIG. 3 is an exploded side perspective view of the exemplary laser brazing system and exemplary cooling collar shown in FIG. 2;

FIG. 4 is a side elevation view of the exemplary laser brazing system and exemplary cooling collar shown in FIG. 2;

FIG. 5 is a schematic diagram illustrating exemplary coolant circuits of the exemplary laser brazing system and exemplary cooling collar shown in FIG. 2;

FIG. 6 is a side elevation view of the exemplary cooling collar shown in FIG. 2;

FIG. 7 is a rear elevation view of an exemplary collar body of the exemplary cooling collar shown in FIG. 2;

FIG. 8 is a side elevation view of an exemplary cooling conduit of the exemplary cooling collar shown in FIG. 2;

FIG. 9 is a rear elevation view of the exemplary cooling conduit of the exemplary cooling collar shown in FIG. 2; and FIG. 10 is a graph plotting the reflectance of four different materials that may be used for the exemplary cooling collar shown in FIG. 2.

DETAILED DESCRIPTION

Referring to the Figures, like numerals indicate corresponding parts throughout the several views.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, steps, operations, elements, and/or components, but do not preclude the presence or addition of one or more other features, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "disposed on" or "connected to" another element, it may be disposed directly on or connected directly to the other element, or intervening elements may be present. Other words used to describe the relationship between elements should be interpreted in a like fashion (e.g., "between," "adjacent," etc.). Although the terms first, second, third, etc. may be used herein to describe various elements, components, regions, and/or sections, these elements, components, regions, and/or sections should not be limited by these terms. These terms may be only used to distinguish one element, component, region, or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments. Spatially relative terms, such as "inner," "outer," "inside," "outside," and the like, may be used herein for ease of description to describe one element or feature's relationship to another element(s) or feature(s) as illustrated in the figures, but are not intended to be limiting.

A known laser brazing system 10 is illustrated in FIG. 1. The laser brazing system 10 includes an attachment arm 22 that holds a torch body 24. The attachment arm 22 may be part of a robotic welder (not shown). Such machines are common in the automotive industry, where they are used to weld, cut, and/or braze components of a vehicle. For example, vehicle body panels are typically welded, cut, and/or brazed using one or more robotic welders as the vehicle travels along an assembly line. The attachment arm 22 of the laser brazing system 20 terminates at a torch coupling 26 that receives and operably supports at least part of the torch body 24. A wire feed tip 28 is connected to the torch body 24. The torch body 24 dispenses a feed wire 30 from the wire feed tip 28. A laser processing head 32 is positioned adjacent to the wire feed tip 28. During laser brazing operations, the laser processing head 32 directs laser light 33 onto the feed wire 30 exiting the wire feed tip 28. The laser light 33 melts the feed wire 30, allowing it to flow into a joint of a workpiece (not shown). Accordingly, the feed wire 30 is a consumable component that is applied to the workpiece. The feed wire 30 is typically made of a material that has a lower melting temperature that the material of the workpiece. By way of non-limiting example, the feed wire 30 may be made of bronze. The attachment arm 22 and the torch body 24 may be made from the same material or from different materials. By way of example and without limitation, the attachment arm 22 and the torch body 24 may be made of a metal, such as aluminum or steel.

The wire feed tip 28 is the closest component of the laser brazing system 10 to the laser light 33 that is emitted from the laser processing head 32. Consequently, the wire feed tip 28 is subjected to high temperatures during laser brazing operations. The material of the wire feed tip 28 may therefore be selected for heat resistance. In one non-limiting example, the wire feed tip 28 is made of an alloy containing copper, chromium, and zirconium. The wire feed tip 28 ultimately absorbs considerable reflected laser light and can easily overheat, become discolored, wear prematurely, and cause wire feed issues resulting in braze defects and equipment downtime.

With reference to FIGS. 2-5, an improved laser brazing system 20 is illustrated where the laser brazing system 10 shown in FIG. 1 has been fitted with a cooling collar 34. The cooling collar 34 shown in FIGS. 2-5 is constructed in accordance with the subject disclosure for the purpose of providing additional cooling to the wire feed tip 28. The torch body 24 extends along a longitudinal axis 36 from a proximal end 38 to a distal end 40. The torch body 24 includes a nozzle section 42 at the proximal end 38, a cooling section 44 at the distal end 40, and a mounting section 46 disposed between the nozzle section 42 and the cooling section 44. It should be appreciated that the nozzle, cooling, and mounting sections 42, 44, 46 of the torch body 24 may be formed as a single, integral piece or may alternatively be made of separate or multiple components. It should also be appreciated that the nozzle, cooling, and mounting sections 42, 44, 46 of the torch body 24 may be made from the same material or from different materials. By way of example and without limitation, the nozzle, cooling, and mounting sections 42, 44, 46 of the torch body 24 may be made of a metal, such as aluminum or steel.

The nozzle section 42 of the torch body 24 includes a wire feed tip connection 48 at the proximal end 38. In one non-limiting example, the wire feed tip connection 48 is a threaded bore. The nozzle section 42 of the torch body 24 also includes a nozzle wall 50 and a feed wire conduit 52. The nozzle wall 50 defines an outer diameter 54 of the nozzle section 42. The feed wire conduit 52 is disposed inside the nozzle section 42 and is sized to receive the feed wire 30. During laser brazing operations, the feed wire 30 slides through the feed wire conduit 52 in the nozzle section 42 of the torch body 24 as the feed wire 30 is fed towards and out though the wire feed tip 28.

Optionally, the nozzle section 42 of the torch body 24 may include a shielding gas passageway 56. In accordance with this configuration, the feed wire conduit 52 and the shielding gas passageway 56 may be co-axially arranged within the nozzle wall 50, where the shielding gas passageway 56 is positioned annularly between the feed wire conduit 52 and the nozzle wall 50. The nozzle section 42 may further include an O-ring 58 disposed about the nozzle wall 50, a gas nozzle connection 60 adjacent the O-ring 58, and one or more shielding gas apertures 62 that extend through the nozzle wall 50. In one non-limiting example, the gas nozzle connection 60 is provided in the form of one or more threads disposed on the nozzle wall 50. A gas nozzle (not shown) may be threadably connected to the nozzle section 42 of the torch body 24 at the gas nozzle connection 60. The gas nozzle may extend annularly about the nozzle section 42 of the torch body 24 and the wire feed tip 28. During laser brazing operations, a shielding gas can be supplied to the shielding gas passageway 56. The shielding gas provides an oxygen free or oxygen depleted environment surrounding the wire feed tip 28 to eliminated and/or reduce oxidation at the workpiece. Typically, the shielding gas is an inert gas such as helium or argon; however, other semi-inert and/or non-inert gases can be used. The one or more shielding gas apertures 62 in the nozzle wall 50 are arranged in fluid communication with the shielding gas passageway 56. The gas nozzle is positioned to collect the shielding gas exiting the one or more shielding gas apertures 62 and the O-ring 58 provides a seal between the gas nozzle and nozzle wall 50. It should be appreciated that the O-ring 58 is made of a resilient material, such as rubber. The gas nozzle may be made from a variety of different materials, including without limitation, a metal, such as aluminum or steel.

Still referring to FIGS. 2-5, the mounting section 46 of the torch body 24 is received in and supported by the torch coupling 26 of the attachment arm 22. In the example illustrated, the torch coupling 26 has a cylindrical cavity 64. The mounting section 46 of the torch body 24 includes a mounting surface 66 having a cylindrical shape that is complementary in size to the cylindrical cavity 64 of the torch coupling 26. As such, the mounting surface 66 of the torch body 24 contacts the cylindrical cavity 64 of the torch coupling 26 in one of a clearance, interference, or slip fit. Alternatively, the mounting section 46 of the torch body 24 may be directly fastened to the attachment arm 22, integral with the attachment arm 22, or attached to the attachment arm 22 by welding, brazing, soldering, or adhesive.

As best seen in FIG. 3, the wire feed tip 28 is connected to the proximal end 38 of the torch body 24 at the wire feed tip connection 48. Although various different shapes and configurations are possible, in the example illustrated, the wire feed tip 28 includes a frusta-conical nose 68 that tapers to a feed wire outlet 70. The wire feed tip 28 also includes an externally threaded barrel 72 opposite the feed wire outlet 70 that threadably engages the wire feed tip connection 48 of the nozzle section 42 of the torch body 24. The feed wire outlet 70 is sized to contact the feed wire 30 with a clearance or slip fit such that the wire feed tip 28 supports the feed wire 30 as the feed wire 30 is fed out through the feed wire outlet 70. The frusta-conical nose 68 of the wire feed tip 28 may further include one or more tool flats 74 that engage a tool (not shown), such as a wrench, allowing the wire feed tip 28 to be rotated and tightened against the proximal end 38 of the torch body 24.

The cooling section 44 of the torch body 24 includes a cooling barrel 76, a coolant supply connection 78, and a coolant return connection 80 that are disposed at the distal end 40 of the torch body 24. The coolant supply connection 78 is disposed in fluid communication with the cooling barrel 76 for supplying coolant to the cooling barrel 76 during laser brazing operations. The coolant return connection 80 is also disposed in fluid communication with the cooling barrel 76 for receiving coolant from the cooling barrel 76 during laser brazing operations. Although a variety of different coolants can be used, in one non-limiting example, the coolant may be water. As best seen in FIG. 4, the cooling section 44 of the torch body 24, including the cooling barrel 76, may be arranged off-center relative to the longitudinal axis 36. While the cooling barrel 76 does provide cooling for the torch body 24, the cooling barrel 76 is located at the distal end 40 of the torch body 24 and the wire feed tip 28 is located at the proximal end 38 of the torch body 24. Heat flow through the torch body 24 is inadequate and as a result, the cooling barrel 76, by itself, does not sufficiently cool the wire feed tip 28 during laser brazing operations, where temperatures at the wire feed tip 28 can exceed 1,000 degrees Fahrenheit (° F.).

In configurations of the laser brazing system 20 where the nozzle section 42 of the torch body 24 includes the shielding gas passageway 56, a shielding gas supply connection 82 may be provided at the distal end 40 of the torch body 24. The shielding gas supply connection 82 is disposed in fluid communication with the shielding gas passageway 56. During laser brazing operations, the shielding gas supply connection 82 may be used to supply shielding gas to the shielding gas passageway 56. It should be appreciated that the shielding gas passageway 56 and/or the feed wire conduit 52 are not necessarily limited to the nozzle section 42 of the torch body 24 and may extend through all or part of the mounting and/or cooling sections 46, 44 of the torch body 24.

With reference to FIG. 5, the laser processing head 32 includes a laser optics assembly 84, which may include one or more lens, mirrors, and other components for re-directing and focusing the laser light on the feed wire 30 exiting the feed wire outlet 70 of the wire feed tip 28. The laser processing head 32 also includes a processing head cooling cavity 86 for receiving the coolant. A heat shield 88 may optionally be attached to the laser processing head 32, which includes a heat shield cooling cavity 90, also for receiving the coolant. The laser light 33 passing through the laser processing head 32, including through the laser optics assembly 84, generates heat. Coolant flow through the processing head cooling cavity 86 cools the laser processing head 32, preventing the laser processing head 32 from becoming overheated. The heat shield 88 protects the laser processing head 32 from heat and laser light 33 reflected back towards the laser processing head 32 from the feed wire 30 and the workpiece. Coolant flow through the heat shield cooling cavity 90 cools the heat shield 88, preventing the heat shield 88 from becoming overheated.

A collimator 92 is attached to the laser processing head 32. The collimator 92 receives the laser light 33, collimating and/or narrowing the beam before the laser light 33 enters the laser processing head 32. The collimator 92 includes a collimator cooling cavity 94 for receiving the coolant. The laser light 33 passing through the collimator 92 generates heat. Coolant flow through the collimator cooling cavity 94 cools the collimator 92, preventing the collimator 92 from becoming overheated. The laser brazing system 20 also includes a laser resonator 96. The laser resonator 96 generates the laser light 33 used in the laser brazing operations. The laser resonator 96 includes a resonator cooling cavity 98 for receiving the coolant. Generation of the laser light 33 by the laser resonator 96 produces heat. Coolant flow through the resonator cooling cavity 98 cools the laser resonator 96, preventing the laser resonator 96 from overheating. Various different laser resonators 96 may be used without departing from the scope of the subject disclosure. One suitable laser resonator 96 is available from Laserline, Inc. of Santa Clara, Calif.

A laser light cable 100 extends between the laser resonator 96 and the collimator 92. The laser light cable 100 transmits (i.e. transports, communicates, or carries) the laser light 33 generated by the laser resonator 96 to the collimator 92. Accordingly, the laser light 33 generated by the laser resonator 96 passes through the laser light cable 100, through the collimator 92, and through the laser processing head 32, where the laser light 33 is directed towards the feed wire 30 exiting the feed wire outlet 70 of the wire feed tip 28 and the workpiece. Various different laser light cables 100 may be used, including fiber optic cables. One suitable laser light cable 100 is available from HIGHYAG Lasertechnologie, Inc. of Saxonburg, Pa.

Optionally, a laser power meter 102 may be provided to measure a power of the laser light 33 directed at the feed wire 30 exiting the feed wire outlet 70 of the wire feed tip 28. The power of the laser light 33 detected by the laser power meter 102 can then be used to adjust the laser resonator 96, collimator 92, and/or laser processing head 32. The laser power meter 102 includes a power meter cooling cavity 104 for receiving the coolant. The laser power meter 102 is subjected to heat and laser light 33 that reflects off of the feed wire 30 and the workpiece. Coolant flow through the power meter cooling cavity 104 cools the laser power meter 102, preventing the laser power meter 102 from becoming overheated.

A chiller 106 supplies the coolant to the collimator 92, the laser processing head 32, the heat shield 88, the cooling barrel 76 of the cooling section 44 of the torch body 24, the laser resonator 96, and the laser power meter 102. Various different chillers 106 may be used without departing from the scope of the subject disclosure. One suitable chiller 106 is available from Riedel USA Cooling Technology of Kalamazoo, Mich. The chiller 106 may be connected to the collimator 92, the laser processing head 32, the heat shield 88, the cooling barrel 76, the laser resonator 96, and the laser power meter 102 through one or more coolant lines 108, 110, 112, 114, 116, 118, 120, 122, 124.

Still referring to FIG. 5, a first coolant line 108 extends between the chiller 106 and the collimator cooling cavity 94 for communicating the coolant from the chiller 106 to the collimator 92. A second coolant line 110 extends between the collimator cooling cavity 94 and the processing head cooling cavity 86 for communicating the coolant from the collimator 92 to the laser processing head 32. A third coolant line 112 extends between the processing head cooling cavity 86 and the heat shield cooling cavity 90 for communicating the coolant from the laser processing head 32 to the heat shield 88. A fourth coolant line 114 extends between the heat shield cooling cavity 90 and the coolant supply connection 78 at the distal end 40 of the torch body 24 for communicating the coolant from the heat shield 88 to the cooling barrel 76 of the torch body 24. A fifth coolant line 116 extends between the coolant return connection 80 at the distal end 40 of the torch body 24 and the chiller 106 for communicating the coolant from the cooling barrel 76 of the torch body 24 to the chiller 106. Accordingly, the first, second, third, fourth, and fifth coolant lines 108, 110, 112, 114, 116 and the collimator cooling cavity 94, the processing head cooling cavity 86, the heat shield cooling cavity 90, and the cooling barrel 76 of the torch body 24 cooperate to form a brazing head cooling circuit 126 for circulating the coolant.

A sixth coolant line 118 extends between the chiller 106 and the resonator cooling cavity 98 for communicating the coolant from the chiller 106 to the laser resonator 96. A seventh coolant line 120 extends between the resonator cooling cavity 98 and the chiller 106 for communicating the coolant from the laser resonator 96 to the chiller 106. The sixth and seventh coolant lines 118, 120 and the resonator cooling cavity 98 cooperate to form a laser resonator cooling circuit 128 for circulating the coolant. An eighth coolant line 122 extends between the chiller 106 and the power meter cooling cavity 104 for communicating the coolant from the chiller 106 to the laser power meter 102. A ninth coolant line 124 extends between the power meter cooling cavity 104 and the chiller 106 for communicating the coolant from the laser power meter 102 to the chiller 106. The eighth and ninth coolant lines 122, 124 and the power meter cooling cavity 104 cooperate to form a laser power meter cooling circuit 130 for circulating the coolant.

Optionally, a first filter unit 132 may be installed along the first coolant line 108 and/or a second filter unit 134 may be installed along the sixth coolant line 118 for filtering the coolant passing through the first and sixth coolant lines 108, 118. Various types of filters may be used for the first and second filter units 132, 134 without departing from the scope of the subject disclosure. By way of example and without limitation, the first and second filter units 132, 134 may be canister-style particulate filters. As another option, a first flow switch 136 may be installed along the fifth coolant line 116 and/or a second flow switch 138 may be installed along the ninth coolant line 124 for controlling coolant flow through the fifth and ninth coolant lines 116, 124. Various types of fluid switches or valves may be used for the first and second flow switches 136, 138 without departing from the scope of the subject disclosure. One suitable flow switch is Part No. #PF2W704T-N03-67 available from SMC Corporation of America of Noblesville, Ind.

With reference to FIGS. 2-5 and further reference to FIGS. 6-9, the cooling collar 34 is disposed on the nozzle section 42 of the torch body 24 adjacent the proximal end 38 of the torch body 24 and longitudinally between the proximal end 38 of the torch body 24 and the gas nozzle connection 60. During laser brazing operations, the cooling collar 34 operates to cool the wire feed tip 28. The cooling collar 34 includes a collar body 140 and a coolant conduit 142 that is connected to the collar body 140. It should be appreciated that the collar body 140 and the coolant conduit 142 may be one-piece or formed of multiple pieces. The collar body 140 includes a first segment 144 that defines a first end 146 of the collar body 140, a second segment 148 that defines a second end 150 of the collar body 140, and a through-bore 152. The first end 146 of the collar body 140 extends in a first collar body plane 154 that is transverse to the longitudinal axis 36. The second end 150 of the collar body 140 extends in a second collar body plane 156 that is that is transverse to the longitudinal axis 36 and parallel to the first collar body plane 154. The through-bore 152 extends co-axially with the longitudinal axis 36 through the first and second segments 144, 148 of the collar body 140 from the first end 146 to the second end 150. The through-bore 152 of the collar body 140 defines an inner diameter 158 of the collar body 140 that is sized to receive the nozzle section 42 of the torch body 24, where the nozzle wall 50 of the torch body 24 contacts and extends through the through-bore 152 of the collar body 140 such that the first end 146 of the collar body 140 is flush (i.e. aligned) with the proximal end 38 of the torch body 24 when the cooling collar 34 is installed on the torch body 24. It should also be appreciated that the first and second segments 144, 148 of the cooling collar 34 may be formed as a single, integral piece or may alternatively be made of separate or multiple components.

The inner diameter 158 of the collar body 140 and the outer diameter 54 of the nozzle section 42 have a tolerance therebetween that provides a slip fit between the through-bore 152 of the collar body 140 and the nozzle wall 50 of the torch body 24. The first segment 144 of the collar body 140 has a first outer surface 160 and the second segment 148 of the collar body 140 has a second outer surface 162. In the illustrated example, the first and second segments 144, 148 of the collar body 140 each have a cylindrical shape. Accordingly, the first segment 144 of the collar body 140 has a first outside diameter 164 that is measured across the first outer surface 160 and the second segment 148 of the collar body 140 has a second outside diameter 166 that is measured across the second outer surface 162. The second segment 148 of the collar body 140 is larger than the first segment 144 of the collar body 140, where the second outside diameter 166 of the second segment 148 is larger than the first outside diameter 164 of the first segment 144. The second segment 148 of the collar body 140 includes a transitional wall 168 opposite the second end 150 of the collar body 140. The transitional wall 168 is located where the first segment 144 of the collar body 140 transitions to the second segment 148 of the collar body 140 and extends from the first outer surface 160 of the first segment 144 of the collar body 140 to the second outer surface 162 of the second segment 148 of the collar body 140. The transitional wall 168 extends in a transitional wall plane 170 that is transverse to the longitudinal axis 36 and that is parallel to and positioned between the first and second collar body planes 154, 156.

As best seen in FIG. 7, the collar body 140 includes a longitudinal cut 172, disposed (i.e. off-set) to one side of the longitudinal axis 36, that extends longitudinally through the first and second segments 144, 148 of the collar body 140 and radially from the through-bore 152 to the first and second outer surfaces 160, 162 of the first and second segments 144, 148 of the collar body 140. The longitudinal cut 172 gives the collar body 140 a C-shaped cross-section 174. The second segment 148 of the collar body 140 includes one or more fastener bores 176 that are transverse to and extends through the longitudinal cut 172 in the collar body 140. Each fastener bore 176 includes a first section 178 that has a counter-sink and a second section 180 that is internally threaded. As shown in FIG. 6, fastener 182 is received in each of the fastener bores 176, which threadably engage the second section 180 of the fastener bores 176 to clamp the collar body 140 of the cooling collar 34 to the nozzle wall 50 of the nozzle section 42 of the torch body 24. Obviously, the cooling collar 34 can be clamped or otherwise attached to the nozzle section 42 of the torch body 24 in other ways without departing from the scope of the subject disclosure.

The coolant conduit 142 of the cooling collar 34 is connected in fluid communication with the brazing head cooling circuit 126. As a result, the coolant conduit 142 of the cooling collar 34 receives coolant from the chiller 106. The coolant conduit 142 includes an end portion 184 and a leg portion 186. As best seen in FIG. 6, the end portion 184 of the coolant conduit 142 is positioned longitudinally between the first collar body plane 154 and the transitional wall plane 170. In addition, the end portion 184 of the coolant conduit 142 is attached to and extends at least partially about the first outer surface 160 of the first segment 144 of the collar body 140 and the transition wall of the second segment 148 of the collar body 140. More specifically, in the example illustrated, the end portion 184 of the coolant conduit 142 extends about the first segment 144 of the collar body 140 in a U-shaped path 188 (FIG. 9) that runs parallel to the first collar body plane 154 and the transitional wall plane 170.

The leg portion 186 of the coolant conduit 142 includes a supply leg 190 and a return leg 192. The supply and return legs 190, 192 of the leg portion 186 each extend at an angle from the end portion 184 of the coolant conduit 142. The supply and return legs 190, 192 of the leg portion 186 of the coolant conduit 142 cross the second collar body plane 156 and pass along at least part of the torch body 24. The supply and return legs 190, 192 of the leg portion 186 of the coolant conduit 142 are connected in fluid communication with the brazing head cooling circuit 126. During brazing operations, coolant enters the coolant conduit 142 through the supply leg 190 and exits the coolant conduit 142 through the return leg 192. Although other configurations are possible without departing from the scope of the subject disclosure, in the illustrated example, the end portion 184, the supply leg 190, and the return leg 192 of the coolant conduit 142 have a tubular shape. Accordingly, the end portion 184, the supply leg 190, and the return leg 192 of the coolant conduit 142 have an inside diameter 194. In one example, the inside diameter 194 of the end portion 184, the supply leg 190, and the return leg 192 of the coolant conduit 142 may range from 0.10 to 0.15 inches (in) to provide a volumetric coolant flowrate through the coolant conduit 142 of approximately 0.15 gallons per minute (GPM) at a pressure of 40 pounds per square inch (psi).

During laser brazing operations, the cooling collar 34 is subjected to heat and laser light 33 that is reflected off of the feed wire 30 and the workpiece. As a result, material selection for the cooling collar 34 is important. The collar body 140 and the coolant conduit 142 of the cooling collar 34 may be made of the same or different materials; however, it has been found that the most suitable material(s) for the collar body 140 and the coolant conduit 142 are materials that reflect a high percentage of laser light 33, as opposed to materials that absorb a high percentage of laser light 33. In accordance with the subject disclosure, the material(s) of the collar body 140 and the coolant conduit 142 have a reflectance of at least 90 percent (%) at a wavelength of 980 nanometers (nm). This wavelength corresponds to the wavelength of the laser light 33 that is emitted by the laser processing head 32. Adhering to this design criteria ensures that the cooling collar 34 remains cool during laser brazing operations and does not overheat as a result of absorbing a high percentage of the laser light 33 reflecting off of the feed wire 30 and the workpiece.

A non-exhaustive and non-limiting list of suitable materials for the collar body 140 and the coolant conduit 142 of the cooling collar 34 include copper, aluminum, silver, and gold. FIG. 10 is a graph plotting the reflectance of these four materials, where reflectance, expressed as a percentage, appears along the y-axis and wavelength, expressed in micrometers (μm), appears along the x-axis. A vertical line 196 has been drawn at a wavelength of 0.98 micrometers (μm), which is equivalent to 980 nanometers (nm). As can be seen from the four plots, copper, aluminum, silver, and gold all have a reflectance of at least 90 percent (%) (i.e. 90 percent (%) or more) at a wavelength of 0.98 micrometers (μm) or 980 nanometers (nm). The following equation can be used for determining the reflectance of a metal:

$$R(\%) = \frac{(n-1)^2 + k^2}{(n+1)^2 + k^2} \times 100$$

With reference to the equation set forth above, R is reflectance, n is index of refraction, and k is extinction coefficient. The values for n and k are available for a wide variety of different metals over a range of different wavelengths. At 0.98 micrometers (μm), the values of n and k are approximately 0.33 and 6.60 for copper, 1.35 and 9.58 for aluminum, 0.21 and 6.76 for silver, and 0.26 and 6.82 for gold.

The material(s) of the collar body 140 and the coolant conduit 142 also need to have good thermal conductivity to enable the cooling collar 34 to efficiently conduct heat away from the wire feed tip 28 and transfer the heat to the coolant flowing through the coolant conduit 142. In accordance with the subject disclosure, the material(s) of the collar body 140 and the coolant conduit 142 also have a thermal conductivity of at least 200 watts per meter kelvin (W/(m·K)) at a temperature of 25 degrees Celsius (° C.). Copper, aluminum, silver, and gold also fit this design criteria, where: the thermal conductivity of copper is 401 watts per meter kelvin (W/(m·K)) at 25 degrees Celsius (° C.), the thermal conductivity of aluminum is 205 watts per meter kelvin (W/(m·K)) at 25 degrees Celsius (° C.), the thermal conductivity of silver is 429 watts per meter kelvin (W/(m·K)) at 25 degrees Celsius (° C.), and the thermal conductivity of gold is 310 watts per meter kelvin (W/(m·K)) at 25 degrees Celsius (° C.).

Advantageously, the cooling collar 34 of the subject disclosure significantly reduces temperatures of the wire feed tip 28 during laser brazing operations. Testing has shown that the wire feed tip 28 reaches temperatures of 1200 to 1500 degrees Fahrenheit (° F.) when the cooling collar 34 is not installed. Such temperatures gave the wire feed tip 28 a mean time between failures (MTBF) of 1 hour, requiring replacement of the wire feed tip 28 after completing laser brazing operations on approximately 40 vehicles. When the cooling collar 34 is installed, the wire feed tip 28 remains near ambient temperatures and the wire feed tip 28 has a mean time between failures (MTBF) of 6.25 hours. As a result, the same wire feed tip 28 can be used to complete laser brazing operations on more than 250 vehicles. In addition to increased wire feed tip 28 life and reduced equipment downtime, the cooling collar 34 also improves braze quality because lower temperatures at the wire feed tip 28 ensures a more consistent feed of the feed wire 30 through the feed wire outlet 70. Another benefit of the cooling collar 34 of the subject disclosure is that the coolant conduit 142 is fed with coolant from an existing coolant source, the chiller 106, so no additional cooling equipment is required.

Obviously, many modifications and variations of the present invention are possible in light of the above teachings and may be practiced otherwise than as specifically described while within the scope of the appended claims. These antecedent recitations should be interpreted to cover any combination in which the inventive novelty exercises its utility. The use of the word "said" in the apparatus claims refers to an antecedent that is a positive recitation meant to be included in the coverage of the claims whereas the word "the" precedes a word not meant to be included in the coverage of the claims.

What is claimed is:

1. A laser brazing system comprising:
a torch body extending from a proximal end to a distal end;
said torch body including a nozzle section at said proximal end, a cooling section at said distal end, and a mounting section disposed between said nozzle section and said cooling section;
said nozzle section of said torch body including a nozzle wall, a feed wire conduit arranged within said nozzle section, and a wire feed tip connection at said proximal end of said torch body;
said cooling section of said torch body including a cooling barrel, a coolant supply connection that is disposed in fluid communication with said cooling barrel for supplying coolant to said cooling barrel, and a coolant return connection that is disposed in fluid communication with said cooling barrel for receiving coolant from said cooling barrel;
a wire feed tip connected to said proximal end of said torch body at said wire feed tip connection, said wire feed tip including a feed wire outlet;
a laser processing head positioned to direct laser light toward said feed wire outlet of said wire feed tip; and
a cooling collar disposed on said nozzle section of said torch body for cooling said wire feed tip during laser brazing operations, said cooling collar including a collar body and a coolant conduit that is connected to said collar body, said collar body having a through-bore that is sized to contact and receive said nozzle wall of said nozzle section of said torch body, said coolant conduit having an end portion that is attached to said collar body and a leg portion that is disposed in fluid communication with said end portion for communicating coolant to and from said end portion of said coolant conduit.

2. The laser brazing system as set forth in claim 1, wherein said collar body and said coolant conduit are made of one or more materials that have a reflectance of at least 90 percent at a wavelength of 980 nanometers.

3. The laser brazing system as set forth in claim 2, wherein said one or more materials of said collar body and said coolant conduit have a thermal conductivity of at least 200 watts per meter kelvin at a temperature of 25 degrees Celsius.

4. The laser brazing system as set forth in claim 3, wherein said one or more materials of said collar body and said coolant conduit include at least one of copper, aluminum, silver, and gold.

5. The laser brazing system as set forth in claim 1, wherein said leg portion of said coolant conduit includes a supply leg and a return leg that are spaced apart and that extend from said end portion of said coolant conduit.

6. The laser brazing system as set forth in claim 5, wherein said end portion, said supply leg, and said return leg of said coolant conduit each has a tubular shape.

7. The laser brazing system as set forth in claim 6, wherein said end portion, said supply leg, and said return leg of said coolant conduit each has an inside diameter that ranges from 0.10 inches to 0.15 inches provides a volumetric coolant flowrate through said coolant conduit of at least 0.15 gallons per minute at a coolant pressure of 40 pounds per square inch.

8. The laser brazing system as set forth in claim 5, wherein said collar body includes a first segment defining a first end of said collar body, a second segment defining a second end of said collar body, and a transitional wall where said collar body transitions from said first segment to said second segment, said first end of said collar body extending in a first collar body plane that is transverse to said through-bore, said second end of said collar body extending in a second collar body plane that is parallel to said first collar body plane and that is transverse to said through-bore, and said transitional wall extending in a transitional wall plane that is parallel to and positioned between said first and second collar body planes and that is transverse to said through-bore.

9. The laser brazing system as set forth in claim 8, wherein said end portion of said coolant conduit is disposed between said first collar body plane and said transitional wall plane and extends about said first segment of said collar body in a U-shaped path and wherein said supply and return legs of said coolant conduit each extend at an angle from said end portion of said coolant conduit and cross said second collar body plane to extend along at least part of said torch body.

10. The laser brazing system as set forth in claim 8, wherein said nozzle section of said torch body extends through said through-bore of said collar body such that said first end of said collar body is flush with said proximal end of said torch body when said cooling collar is installed.

11. The laser brazing system as set forth in claim 8, wherein said first and second segments of said collar body have a cylindrical shape, said first segment of said collar body has a first outer surface and a first outside diameter that is measured across said first outer surface, said second segment of said collar body has a second outer surface and a second outside diameter that is measured across said second outer surface, said second outside diameter of said second segment being larger than said first outside diameter of said first segment such that said transitional wall of said collar body extends from said first outer surface of said first segment to said second outer surface of said second segment.

12. The laser brazing system as set forth in claim 1, wherein said through-bore of said collar body extends co-axially along a longitudinal axis and has an inner diameter, said nozzle section of said torch body has an outer diameter defined by said nozzle wall, and said inner diameter of said through-bore and said outer diameter of said nozzle section having a tolerance therebetween to provide a slip fit between said through-bore of said collar body and said nozzle wall of said torch body.

13. The laser brazing system as set forth in claim 12, wherein said collar body includes a longitudinal cut disposed to one side of said longitudinal axis that extends longitudinally through said collar body and radially outwardly from said through-bore to give said collar body a C-shaped cross-section, said collar body further including at least one fastener bore that is transverse to and extends through said longitudinal cut.

14. The laser brazing system as set forth in claim 13, wherein said at least one fastener bore includes a first section disposed on one side of said longitudinal cut and a second section disposed on an opposite side of said longitudinal cut, said second section of said at least one fastener bore being internally threaded for engagement with a fastener that operably clamps said collar body to said nozzle wall of said nozzle section of said torch body.

15. The laser brazing system as set forth in claim 1, wherein said leg portion of said coolant conduit of said cooling collar and said coolant supply and return connections of said cooling section of said torch body are disposed in fluid communication with a chiller through connection to a brazing head cooling circuit.

\* \* \* \* \*